United States Patent [19]
Haerle

[11] Patent Number: 5,456,069
[45] Date of Patent: Oct. 10, 1995

[54] EXHAUST GAS FILTER

[75] Inventor: Hans A. Haerle, Bopfingen, Germany

[73] Assignee: Schwaebische Huettenwerke GmbH, Aalen-Wasseralfingen, Germany

[21] Appl. No.: 777,421

[22] Filed: Oct. 10, 1991

Related U.S. Application Data

[63] Continuation of Ser. No. 466,176, Jan. 17, 1990, abandoned.

[30] Foreign Application Priority Data

Jan. 20, 1989 [DE] Germany .................... 39 01 609.9

[51] Int. Cl.$^6$ ............................................. B01D 29/07
[52] U.S. Cl. ...................... 55/498; 55/520; 55/523; 264/DIG. 48
[58] Field of Search .............. 55/520, 523, 498; 261/112.1, 112.2; 210/347, 493.4, 497.1; 264/DIG. 48

[56] References Cited

U.S. PATENT DOCUMENTS

| | | | |
|---|---|---|---|
| 2,038,071 | 4/1936 | Wilhelm | 55/520 X |
| 2,322,548 | 6/1943 | Sigmund | 55/520 X |
| 3,112,184 | 11/1963 | Hollenbach | 55/520 X |
| 3,874,899 | 4/1975 | Miszenti et al. | 55/523 X |
| 4,128,684 | 12/1978 | Bomio et al. | 261/112.2 X |
| 4,501,663 | 2/1985 | Merrill | 210/347 |
| 4,652,286 | 3/1987 | Kusuda et al. | 55/523 |
| 4,662,915 | 5/1987 | Shirai et al. | 55/523 X |

Primary Examiner—Richard L. Chiesa
Attorney, Agent, or Firm—Jenner & Block

[57] ABSTRACT

An exhaust gas filter employed to remove harmful components from exhaust gases, more particularly from exhaust gases expelled by combustion engines, includes flow channels or chambers having gas-permeable walls. The walls are formed by a band having compression-moulded material and spacers with the band wound into a spiral. The spacers serve to form flow channels by maintaining a space between the individual windings of the band. The band and, if required, further parts of the proposed filter are then sintered together to form a unit.

12 Claims, 1 Drawing Sheet

EXHAUST GAS FILTER

This application is a continuation of application Ser. No. 07/466,176, filed Jan. 17, 1990, now abandoned.

TECHNICAL FIELD

The present invention relates to exhaust gas filters employed to remove harmful components from exhaust gases and, more particularly, from exhaust gases expelled by combustion engines.

BACKGROUND OF THE INVENTION

Exhaust gas filters are being used increasingly to remove harmful substances contained in the exhaust gases of combustion engines. Prior art soot filters, produced from ceramic materials and employed in conjunction with diesel engines, feature filter bodies whose inlet channels admit hot engine exhaust gases that penetrate the porous filter walls bordering such channels and then exit clean through outlet channels. The high operating temperature of conventional exhaust gas filters causes the soot, i.e., carbon trapped in the filter walls, to be converted to gas and ash, which are then expelled together with the exhaust gases out of the exhaust pipe.

The disadvantage of this type of filter is that removal of the carbon soot is determined and also limited by the distribution and the round shape of the pores in the filter wall. A further disadvantage of ceramic filters is that they have a low resistance to sudden temperature changes, local overheating, bumps and knocks.

Also known in the art are exhaust gas catalyzers that are, by means of catalytic processes, able to remove from exhaust gases other harmful components such as carbon monoxide, hydrocarbons and nitrogen oxides. Such catalyzers make use of, for example, filters coated with platinum, rhodium, vanadium or other materials possessing catalytic properties. Besides being very expensive, such filters are limited in both durability and effectiveness.

It has been suggested that the filter body could be manufactured from moulded high-temperature resistant, sintered material. In addition to being able to withstand thermal shock, knocks and bumps, such a filter exhibits high thermal conductivity over a large internal surface area, a physical relationship that is thermally effective especially when the system is employed as a soot filter in diesel engines. This filter, when used for this purpose, facilitates gasification of the soot particles by improving distribution of particulate over the filter fibers and by permitting, by means of a large surface area, optimal effectiveness of the catalytic process.

SUMMARY OF THE INVENTION

An object of the present invention is the creation of an exhaust gas filter of the kind first mentioned which, besides being very simple to manufacture, operates effectively while taking up little space.

The invention therefore provides a filter made from a band of compression-moulded sinter material provided with spacers with the band wound into a plurality of spirals and the spacers providing the required spacing between the individual windings, to form flow channels between the windings, and wherein the band and, if desired, other parts of the proposed filter are sintered together into a unit.

Development of the proposed filter solution was predicated on the recognition that sinter materials can be rendered and sintered into practically any shape. An effective exhaust filter can be produced quite simply if a compression-moulded band, which is suitably provided with spacers, is wound into the shape presently proposed.

The proposed method permits the creation, in a limited space, of a plurality of flow channels and filter walls. The spacers provided in the filter walls hold the windings apart from each other and serve to create flow channels of proper size.

The band of sintered material is preferably wound about a core that serves both as a definite starting point for the winding procedure and helps to improve the stability of the filter.

In one embodiment of the invention the filter comprises a core having a slit pipe with one of the slit edges lying in a radial plane that is larger than that occupied by the other slit edge, having the inner end of the band joined thereto. Such a pipe, which can be produced from a steel pipe of suitable thermal resistivity, and which is merely provided with a slit, serves as a support pipe for the spiral structure.

In order to create well-defined flow channels, which are necessary if the proposed exhaust gas filter is employed as a catalyzer, the spirally-wound sheet is sub-divided into individual sections by vertically-running separating beads that extend over at least practically the integral length of the spirally-wound band and act to fill in the cavity existing between two adjacent and facing windings. By means of the separating beads, which are arranged preferably after each winding of the band, the spirally-wound band is subdivided into a plurality of individual flow channels that are separated from one another.

It is advantageous to provide alternate windings which are closed on the fronts of both the inlet and the outlet sides of the filter structure. Thus, there is created inlet and outlet channels that are separated from one another by means of an intermediate wall situated between facing adjacently lying spaces. In order to clean the exhaust gases they are forced to flow through the walls located between the separate spiral spaces.

The spacers located on the band can be formed by a variety of methods, one of which is to provide mould beads, ribs or webs into the band to extend at least practically over the integral height of the band, or rather the integral length of the proposed exhaust filter. The provision of such beads, ribs or webs constitutes a simple means of ensuring proper spacing between the individual windings.

Another embodiment of such spacers may comprise their formation by a woven structure formed by a plurality of filaments that are woven together in the horizontal and vertical directions.

Such a woven structure, comprising generally a heat resistant steel weave, ensures high band stability while providing for a high degree of exhaust gas turbulence in the flow chambers. While flowing primarily in the longitudinal direction of the exhaust gas filter, the exhaust gas is also able to follow more oblique flow paths. This arrangement helps improve both the thermal characteristics of the filter construction and heat distribution. The weave structure, which is sintered together with the band to form a unit, improves both stability and vibration resistance.

Employment of a support pipe for the core is a simple means of allowing circumvention of the normal filter flow path, for example, in emergencies. To this end it is necessary merely that the support pipe be closed at one of its two frontal sides with a cap in which is arranged as an emergency relief valve.

In general, however, the support pipe is capped at one or both of its frontal ends in order to allow all of the exhaust gas to flow through the flow channels of the filter structure. If an emergency relief valve is installed, the inside of the support pipe can be used to conduct exhaust gases to the outside.

According to a further broad aspect of the present invention there is provided an exhaust gas filter suitable for removing harmful components from exhaust gases, and more particularly from exhaust gases expelled by combustion engines. The exhaust gas filter has a plurality of flow channels and gas-permeable walls formed by a band comprised of compression-moulded sinter material provided with spacers and wound into a spiral structure. The spiral structure has a number of windings and the spacers serve to separate the individual windings from each other to form the flow channels between the individual windings. At least the band of the filter is sintered into a filter unit.

According to a further broad aspect of the present invention there is provided a method of producing an exhaust gas filter as above described. The method comprises winding a band of compression-moulded sinter material into a spiral shape. Spacers are provided between the bands by moulding into the sinter material or attaching to the sinter material the spacers for separating adjacent and facing windings a predetermined distance. The winding is then sintered to form the filter unit.

DETAILED DESCRIPTION OF THE PREFERRED EMBODIMENTS

Figure 1:
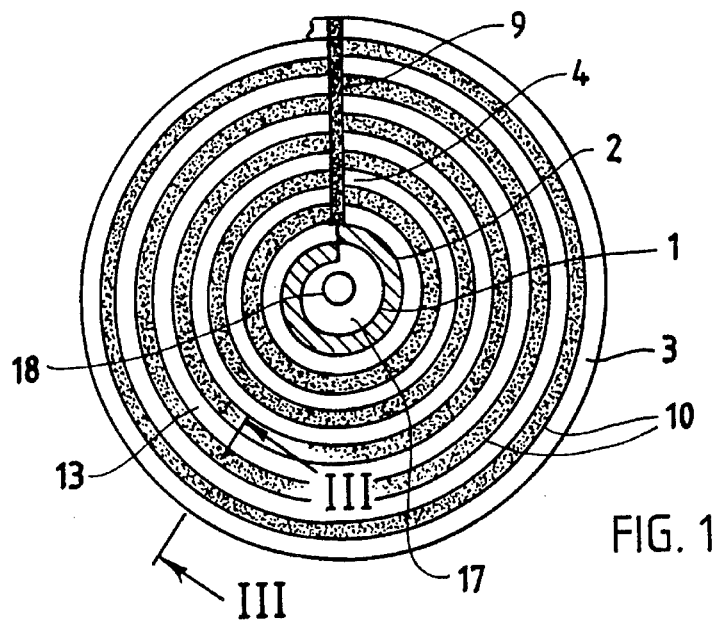
FIG. 1 is a plan view of the exhaust gas filter of the invention.

The starting component in the production of the proposed exhaust gas filter is a pipe 1 formed of heat resistant steel. The pipe 1 is provided with a longitudinal slit, and one of its ends 2 is bent outwardly from the circumference of the pipe.

The core of the proposed exhaust gas filter is formed by a sheet or band 3 having a wall thickness of approximately 0.5 to 5 mm. Sheet 3 is either butt welded or soldered at its starting frontal edge to the slit edge 2 of pipe 1 that has been bent away from the circumferential surface of the pipe 1. Next, the band is wound a number of times around itself to produce a spiral structure. This is shown schematically in FIG. 1. The enlarged sectional view in FIG. 2 shows the band 3 provided with a plurality of beads 5 which are arranged side by side and extend along the integral the length of the proposed exhaust gas filter. The shape and position of such beads 5 is taken into consideration before the band 3, which preferably comprises sintered material, is compression-moulded into the desired shape. When compression-moulded band 3 is wound into the above-mentioned spiral shape, each winding of the resulting spiral structure is separated from the neighboring facing winding by the bead 5, to produce a plurality of flow channels 4, or more particularly, inlet channels 12 and outlet channels 13.

Figure 3:
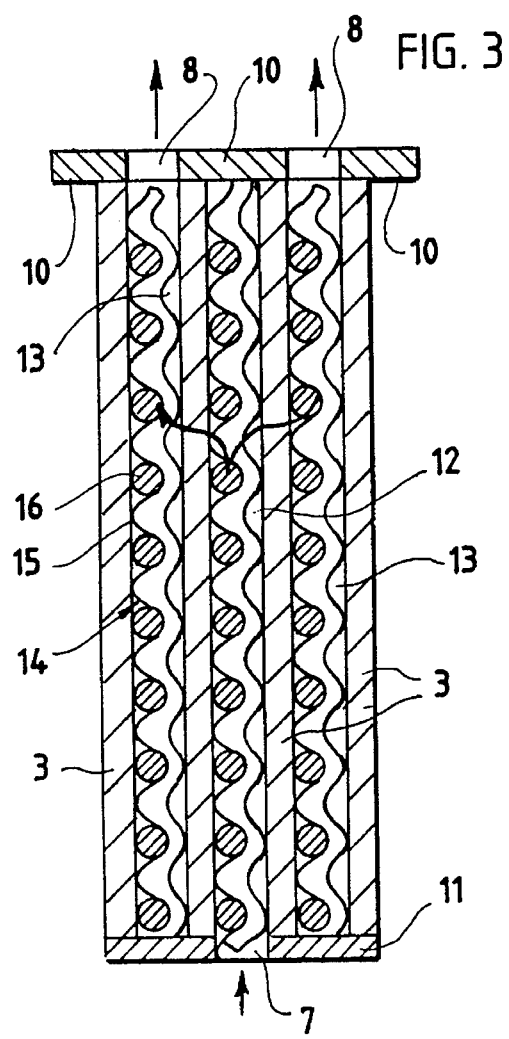
FIG. 3 is an enlarged view of a section through section line 3—3 of FIG. 1 wherein a woven structure is employed as the spacer.

The filter has inlet openings 7 and outlet openings 8, as shown in FIG. 3, and these are produced by the positioning, following each turn of band 3 around pipe 1, which is to say, following every approximate 360°-turn around pipe 1, of a separating bead 9 (see FIG. 1), which can for example be a welded bead extending the integral height, or rather, length of the proposed exhaust gas filter. This procedure produces individual annular chambers, i.e., a number of annular chambers corresponding to the number of windings present in the spiral structure. At the same time, alternate intermediate cavities lying between two neighboring, facing windings are left uncapped by covers 10, 11 on both top and bottom of the proposed exhaust gas filter, and so define inlet and outlet openings 7 and 8. In this manner the flow channels can be separated from one another.

Figure 2:
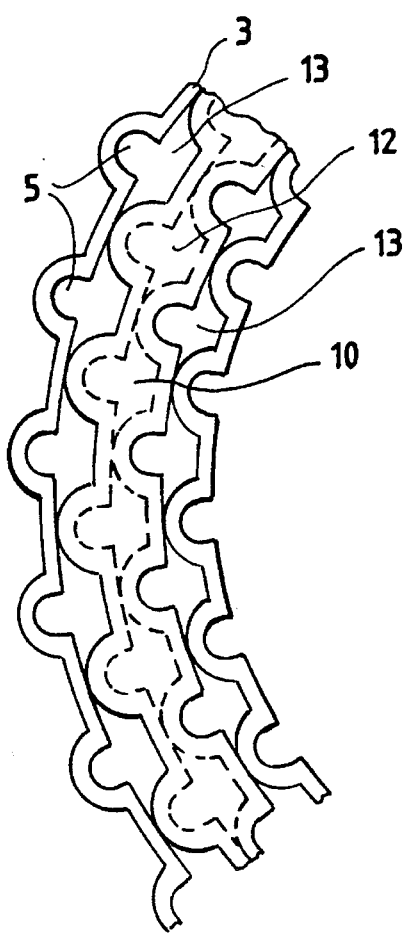
FIG. 2 is an enlarged view of a section of one part of the windings of FIG. 1 having beads for spacers as viewed from the upper frontal end.

FIG. 1 shows a plan view of the proposed exhaust gas filter from the outlet side 8. For the sake of clarity, pipe 1 is shown with hatch marks and covers 10 located on the outlet side 8 are blackened and covers 11 on the inlet side 7 are left open. In this manner, alternating, virtually annular inlet and outlet channels are formed. These are depicted in greater detail in FIGS. 2 and 3. FIG. 2 is a partial view of the upper frontal end or rather a view from the outlet side, while FIG. 3 is a section along section 3—3 showing another embodiment of the present invention. After the winding procedure has been completed, separating beads 9 have been installed during the winding procedure and alternate channels closed off by means of covers 10 and 11, the proposed exhaust gas filter is sintered by a conventional process which serves to bond all components together into one unit.

The gas permeability of the sintered band 3 permits the exhaust gases, which enter through inlet side 7 to inlet channels 12, to penetrate the adjacently-arranged winding walls (see arrows in FIG. 3) to enter output channels 13 and thence to egress through outlet side 8. The exhaust gases are conventionally cleaned during traversal of the proposed filter; when the latter is used in conjunction with a diesel-powered vehicle, exhaust gases are converted into gas and ash.

If band 3 is treated with materials such as the previously mentioned materials that act as catalysts, further harmful components such as carbon monoxide, hydrocarbons and nitrogen oxide can be removed from the exhaust gases.

Because it is possible to adjust within a wide range the solidity or porosity of a given sintered material, it is quite simple to be able to adapt the proposed filter to different operating requirements.

Instead of employing normal sinter powder as the feedstock, large-grained powder or metal shavings, or pieces of metal wire of several millimeters length or woven thin metal wire can be used. Such materials can be compression-moulded and then sintered by conventional means. This method produces a material exhibiting high porosity and consequently optimal gas permeability over a large surface area.

As can be appreciated from FIG. 3, the band 3, instead of having preformed beads 5, can also be provided with a woven structure 14 comprising, e.g., a heat-resistant steel. Such woven structure is normally formed by a plurality of interwoven vertical and horizontal wires 15 and 16, and like covers 10 and 11, is sintered together with band 3 into a unit.

At least one of both frontal sides of pipe 1 is closed by means of a cover 17, whereby the latter is, for the purpose of circumventing the normal flow path of the exhaust gas filter, provided with an emergency relief valve 18.

I claim:

1. An exhaust gas filter suitable for removing harmful components from exhaust gases comprising: a band configured into a spiral winding forming a plurality of flow channels wherein said band is formed of compression-moulded non-ceramic sinter material and a plurality of spacers and wherein said spacers serve to separate the individual windings from each other to form said flow channels between individual windings.

2. An exhaust gas filter in accordance with claim 1 wherein said band is wound about a core.

3. An exhaust gas filter in accordance with claim 2 wherein said core is a pipe configured with a longitudinal slit wherein an outer edge of said slit is disposed in a radial plane that is greater than that of the inner edge of said slit, said inner and outer edges being connected together.

4. An exhaust gas filter in accordance with claim 3 wherein said pipe is closed on at least one of its two frontal ends by means of a cover and wherein an emergency relief valve is provided on said cover.

5. An exhaust gas filter in accordance with claim 1 wherein said spacers include a plurality of vertically oriented separating beads that run at least partially over the integral length of said exhaust gas filter whereby said separating beads serve to separate adjacent and facing windings.

6. An exhaust gas filter in accordance with claim 5 wherein at least one of said separating beads is positioned between each winding of said band.

7. An exhaust gas filter in accordance with claim 5, wherein alternate ones of said channels are sealed at an inlet side and an outlet side respectively of said filter.

8. An exhaust gas filter in accordance with claim 1, wherein said spacers are formed by a plurality of ribs which are moulded into said band and extend the length of said filter.

9. An exhaust gas filter in accordance with claim 1 wherein said spacers are formed by a woven structure formed by a plurality of horizontal and vertical filaments interwoven together.

10. An exhaust gas filter in accordance with claim 9 wherein said woven structure is sintered together with said band into a unit.

11. An exhaust gas filter suitable for removing harmful components from exhaust gases comprising:

a band configured into a spiral winding forming a plurality of flow channels wherein said band is formed of a compression-molded non-ceramic sintered material;

a separating bead located at one angular position between each of said windings to provide separate annular chambers corresponding to the number of said windings;

means for sealing alternate ones of said channels at an inlet side and an outlet side respectively of said filters; and a plurality of spacers formed by a plurality of ribs moulded into said band and spaced radially around said band wherein said spacers serve to separate the individual windings from each other to form said flow channels between said individual windings.

12. An exhaust gas filter suitable for removing harmful components from exhaust gases comprising:

a band configured into a spiral winding forming a plurality of flow channels wherein said band is formed of a compression-molded non-ceramic sintered material;

a separating bead located at one angular position between each of said windings to provide separate annular chambers corresponding to the number of said windings;

means for sealing alternate ones of said channels at an inlet side and an outlet side respectively of said filters; and a plurality of spacers located radially around said band wherein said plurality of spacers include a woven structure formed by a plurality of horizontal and vertical filaments interwoven together wherein said spacers serve to separate the individual windings from each other to form said flow channels between said individual windings.

* * * * *